United States Patent
Yoon et al.

(10) Patent No.: US 7,881,590 B2
(45) Date of Patent: *Feb. 1, 2011

(54) METHOD FOR REPRODUCING CONTENTS INFORMATION IN INTERACTIVE OPTICAL DISC DEVICE AND METHOD FOR PROVIDING CONTENTS INFORMATION IN CONTENTS PROVIDER SERVER

(75) Inventors: Woo Seong Yoon, Namyangjoo-si (KR); Jea Yong Yoo, Seoul (KR); Tae Ho Kim, Seoul (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1782 days.

This patent is subject to a terminal disclaimer.

(21) Appl. No.: 10/714,434

(22) Filed: Nov. 12, 2003

(65) Prior Publication Data

US 2004/0103445 A1   May 27, 2004

(30) Foreign Application Priority Data

Nov. 13, 2002   (KR) ...................... 10-2002-0070447

(51) Int. Cl.
- *H04N 5/76* (2006.01)
- *H04N 5/78* (2006.01)
- *H04N 5/92* (2006.01)
- *H04N 5/84* (2006.01)

(52) U.S. Cl. .................. 386/298; 386/314; 386/326; 386/332; 386/334

(58) Field of Classification Search .......... 386/95, 386/125–126, 48, 111–112, 298, 314, 326, 386/332, 334
See application file for complete search history.

(56) References Cited

U.S. PATENT DOCUMENTS 6,011,590 A * 1/2000 Saukkonen ............ 375/240.05
6,154,773 A   11/2000 Roberts et al.

(Continued)

FOREIGN PATENT DOCUMENTS

EP    1 251 514 A2   10/2002

(Continued)

OTHER PUBLICATIONS

Translation JP07037341, Hidenori Minoda, May 1995.*

*Primary Examiner*—Thai Tran
*Assistant Examiner*—Daquan Zhao
(74) *Attorney, Agent, or Firm*—Birch, Stewart, Kolasch & Birch, LLP

(57) ABSTRACT

Disclosed herein are a method for reproducing contents information in an interactive optical disc device and a method for providing contents information in a contents provider server. The interactive optical disc device is connected with the contents provider server via the Internet to receive a variety of contents information provided from the contents provider server. When the sending of the contents information from the contents provider server to the interactive optical disc device is suspended or delayed due to a network connection loss on the Internet or an insufficient storage capacity of a buffer memory in the interactive optical disc device, contents information re-sent from the contents provider server and a data stream read from an interactive DVD are re-synchronized and reproduced. Therefore, a user of the interactive optical disc device can normally watch more various contents information.

18 Claims, 6 Drawing Sheets

U.S. PATENT DOCUMENTS

| | | | |
|---|---|---|---|
| 6,154,782 A | 11/2000 | Kawaguchi et al. | |
| 6,330,719 B1 | 12/2001 | Zigmond et al. | |
| 6,580,870 B1 | 6/2003 | Kanazawa et al. | |
| 6,591,420 B1 | 7/2003 | McPherson et al. | |
| 6,625,750 B1 * | 9/2003 | Duso et al. | 714/11 |
| 6,640,145 B2 | 10/2003 | Hoffberg et al. | |
| 7,006,881 B1 | 2/2006 | Hoffberg et al. | |
| 7,136,394 B2 * | 11/2006 | Horowitz et al. | 370/468 |
| 7,200,715 B2 * | 4/2007 | Kleiman et al. | 711/114 |
| 7,334,025 B2 | 2/2008 | Kuriya | |
| 2001/0052028 A1 | 12/2001 | Roberts et al. | |
| 2002/0012350 A1 | 1/2002 | Mizukoshi | |
| 2002/0078144 A1 | 6/2002 | Lamkin et al. | |
| 2003/0049017 A1 * | 3/2003 | Chung et al. | 386/95 |
| 2003/0161615 A1 | 8/2003 | Tsumagari et al. | |
| 2004/0103445 A1 | 5/2004 | Yoon et al. | |
| 2005/0251749 A1 * | 11/2005 | Lamkin et al. | 715/719 |

FOREIGN PATENT DOCUMENTS

| | | |
|---|---|---|
| JP | 07037341 * | 5/1995 |
| JP | 9-128408 A | 5/1997 |
| JP | 9-247599 A | 9/1997 |
| JP | 10-136314 A | 5/1998 |
| JP | 11-98467 A | 4/1999 |
| JP | 11-161663 A | 6/1999 |
| JP | 11-288557 A | 10/1999 |
| JP | 2000-295578 A | 10/2000 |
| JP | 2001-24733 A | 1/2001 |
| JP | 2001-230795 A | 8/2001 |
| JP | 2001-306136 A | 11/2001 |
| JP | 2002-16668 A | 1/2002 |
| JP | 2002-135350 A | 5/2002 |
| JP | 2002-330168 A | 11/2002 |
| JP | 2002-330252 A | 11/2002 |
| KR | 10-1999-016897 A | 3/1999 |
| KR | 10-2000-0065447 A | 11/2000 |
| KR | 20010085515 | 9/2001 |
| KR | 20010113441 A | 12/2001 |
| WO | WO9533309 | 12/1995 |
| WO | WO0914935 | 3/1999 |
| WO | WO-2004/044761 A | 5/2004 |

* cited by examiner

METHOD FOR REPRODUCING CONTENTS INFORMATION IN INTERACTIVE OPTICAL DISC DEVICE AND METHOD FOR PROVIDING CONTENTS INFORMATION IN CONTENTS PROVIDER SERVER

BACKGROUND OF THE INVENTION

1. Field of the Invention

The present invention relates to a method for reproducing contents information in an interactive optical disc device and a method for providing contents information in a contents provider (CP) server, wherein a variety of contents information relevant to A/V data of an optical disc, such as an interactive digital versatile disc (I-DVD), is provided from the CP server over the Internet and then reproduced in the interactive optical disc device.

2. Description of the Related Art

Recently, high-density optical discs capable of storing mass digital data, for example, DVDs, have become widespread. These DVDs have been commercially available as large-capacity storage media capable of storing high-quality video data as well as digital audio data.

Such a DVD includes a navigation data recording area for recording navigation data necessary for control of reproduction of video data, and a data stream recording area for recording a digital data stream such as the video data.

Therefore, a general DVD player is adapted to, if the DVD is loaded therein, read the navigation data recorded in the navigation data recording area, store the read navigation data in a memory thereof, and then perform a DVD reproduction operation using the stored navigation data to read and reproduce the video data recorded in the data stream recording area.

As a result, a user of the DVD player can not only watch the high-quality video data recorded on the DVD, but also select and use a variety of functions provided from the DVD.

Meanwhile, a concrete scheme for an interactive digital versatile disc (I-DVD) capable of additionally recording detailed information relevant to A/V data to be reproduced therefrom, as various contents information such as an 'html file', and reproducing the recorded contents information through an interaction with a user is recently under discussion among the associated companies. If this I-DVD is commercially available, the user will be able to readily retrieve the various contents information relevant to the A/V data.

Under discussion is another scheme able to, while reproducing the A/V data and contents information recorded on the I-DVD, receive other various contents information from a contents provider server over the Internet and reproduce the received contents information synchronously with the A/V data being reproduced. In this scheme, however, the sending of the contents information from the contents provider server may be suspended or delayed due to a network connection loss or an insufficient storage capacity of a buffer memory in an interactive optical disc device. In this case, a re-synchronization must be performed with respect to the contents information and A/V data. However, there is currently no concrete scheme for the re-synchronization and there is thus an urgent need for the solution.

SUMMARY OF THE INVENTION

Therefore, the present invention has been made in view of the above problems, and it is an object of the present invention to provide a method for reproducing contents information in an interactive optical disc device and a method for providing contents information in a contents provider server, wherein the interactive optical disc device is connected with the contents provider server via the Internet to receive a variety of contents information provided from the contents provider server and, if the sending of the contents information from the contents provider server to the interactive optical disc device is suspended or delayed, contents information re-sent from the contents provider server and a data stream read from an interactive DVD are re-synchronized and reproduced.

In accordance with one aspect of the present invention, the above and other objects can be accomplished by the provision of a method for producing contents information in an interactive optical disc device, comprising the steps of: a) synchronizing and reproducing data read from an interactive optical disc and contents information sent and downloaded from a contents provider server connected via the Internet; b) if the sending of said contents information from said contents provider server is suspended or delayed, generating a command for requesting re-sending of specific contents information, based upon information about a size of said downloaded contents information, and sending the generated command to said contents provider server; and c) reproducing said specific contents information re-sent from said contents provider server in response to said command together with data read from said interactive optical disc while re-synchronizing it with said data read from said interactive optical disc.

In accordance with another aspect of the present invention, there is provided a method for producing contents information in an interactive optical disc device, comprising the steps of: a) synchronizing and reproducing data read from an interactive optical disc and contents information sent and downloaded from a contents provider server connected via the Internet; b) if the sending of said contents information from said contents provider server is suspended or delayed, pausing a data reproducing operation of said interactive optical disc for a predetermined period of time and determining whether there is contents information received over said Internet; and c) if there is contents information received over said Internet, re-synchronizing and reproducing the received contents information and data read from said interactive optical disc.

In accordance with another aspect of the present invention, there is provided a method for producing contents information in an interactive optical disc device, comprising the steps of: a) synchronizing and reproducing data read from an interactive optical disc and contents information sent and downloaded from a contents provider server connected via the Internet; b) if the sending of said contents information from said contents provider server is suspended or delayed, generating a command for requesting re-sending of specific contents information, based upon a counted contents information synchronization value, and sending the generated command to said contents provider server; and c) reproducing said specific contents information re-sent from said contents provider server in response to said command together with data read from said interactive optical disc while re-synchronizing it with said data read from said interactive optical disc.

In accordance with another aspect of the present invention, there is provided a method for producing contents information in an interactive optical disc device, comprising the steps of: a) synchronizing and reproducing data read from an interactive optical disc and contents information sent and downloaded from a contents provider server connected via the Internet; b) if the sending of said contents information from said contents provider server is suspended or delayed, generating a command for requesting re-sending of specific contents information, based upon offset information of said data read from said interactive optical disc, and sending the generated command to said contents provider server; and c) after a predetermined period of time has elapsed, reproducing said specific contents information re-sent from said contents provider server in response to said command together with data read from said interactive optical disc while re-synchronizing it with said data read from said interactive optical disc.

In accordance with another aspect of the present invention, there is provided a method for providing contents information in a contents provider server, comprising the steps of: a) sequentially sending contents information whose sending is requested by an interactive optical disc device connected via the Internet; b) if the sending of said requested contents information is suspended or delayed, receiving a command, while including a parameter which is information regarding specific contents information, for requesting re-sending of said specific contents information, from said interactive optical disc device; and c) re-sending said specific contents information to said interactive optical disc device in response to said command.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
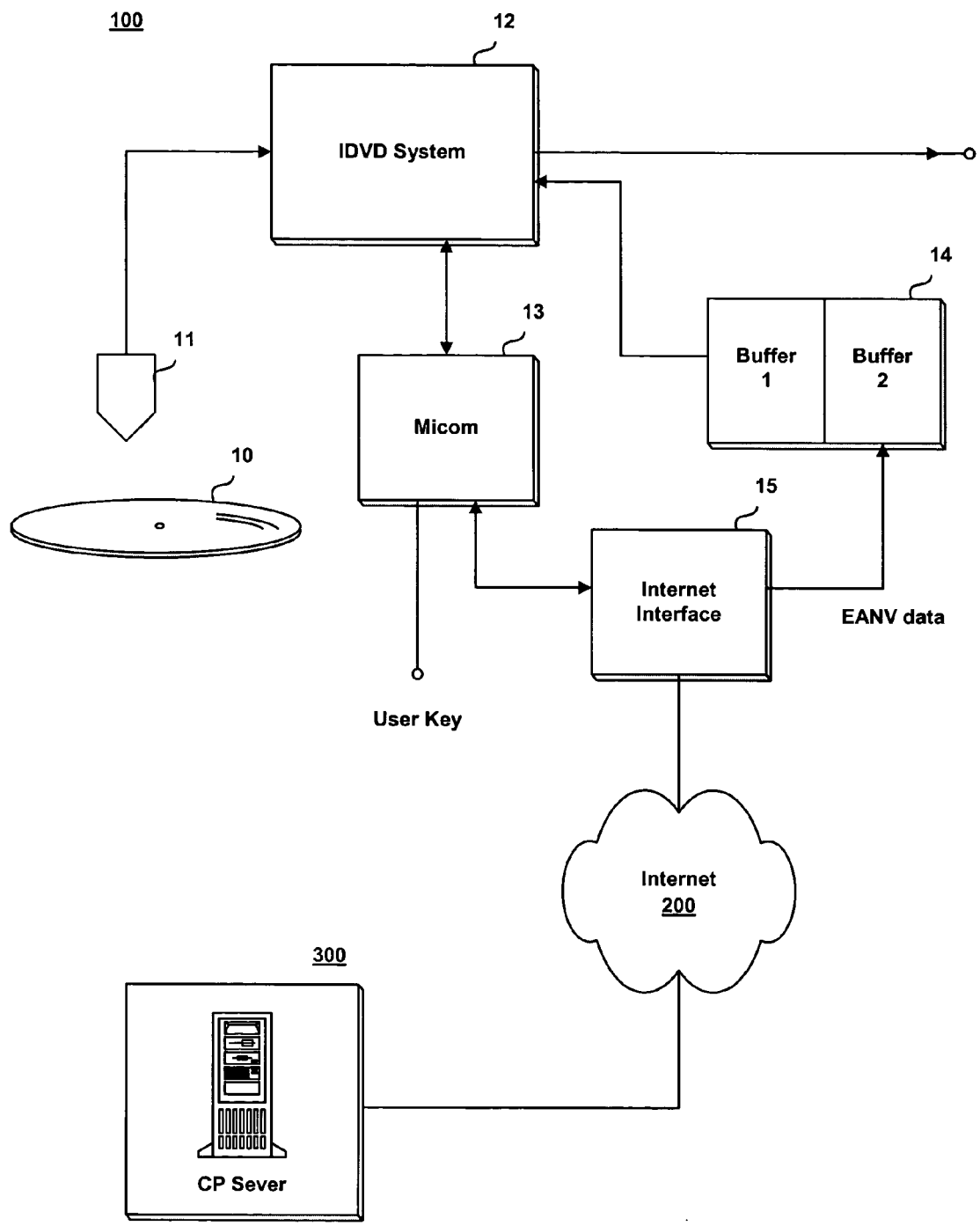
FIG. 1 is a block diagram showing a connection between an interactive optical disc device and a contents provider server to which the present invention is applied.

FIG. 1 shows a connection between an interactive optical disc device and a contents provider server to which the present invention is applied. As shown in this drawing, the interactive optical disc device, for example, an interactive DVD (I-DVD) player 100, comprises an optical pickup 11, I-DVD system 12, microcomputer 13, buffer memory 14 and Internet interface 15.

The I-DVD system 12 is adapted to synchronize and reproduce A/V data and contents information read from an I-DVD 10 and the Internet interface 15 is connected with the contents provider (CP) server, which is denoted by the reference numeral 300, via the Internet 200 by virtue of an interaction between the microcomputer 13 and an enhanced navigator (not shown) in the I-DVD system 12, as shown in FIG. 1.

The buffer memory 14 is adapted to download and temporarily store a variety of contents information, for example, a variety of ENAV (Enhanced Navigation) contents data such as audio data relevant to the video data read from the I-DVD 10, provided from the CP server 300. The buffer memory 14 can be logically divided into a first buffer Buffer 1 and a second buffer Buffer 2.

Figure 2:
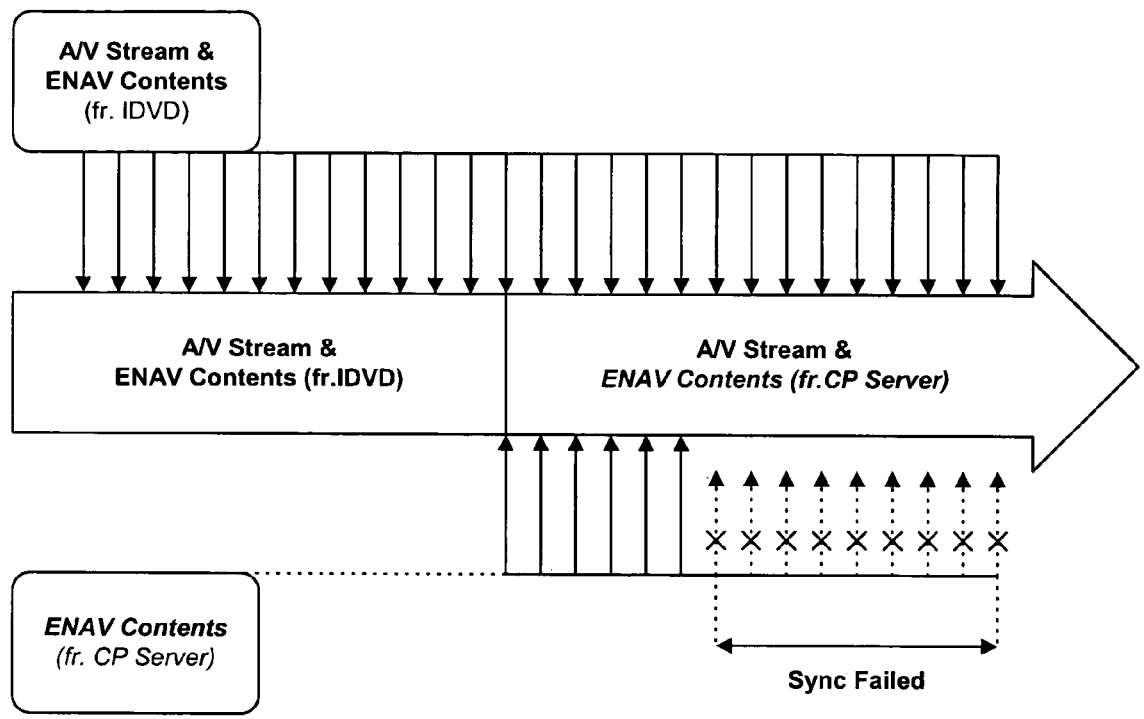
FIG. 2 is a conceptual diagram illustrating a data reproduction operation of the interactive optical disc device to which the present invention is applied.

The enhanced navigator in the I-DVD system 12 functions to, while reproducing an A/V stream and ENAV contents information read from the I-DVD 10, reproduce other ENAV contents information provided from the CP server 300 synchronously with the A/V stream, as shown in FIG. 2.

Therefore, a user of the I-DVD player 100 can watch the ENAV contents information, for example, audio data, provided from the CP server 300 along with the A/V stream and/or ENAV contents information read from the I-DVD 10.

Meanwhile, the provision of the ENAV contents information from the CP server 300, such as the audio data, may be suspended or delayed due to a network connection loss on the Internet or an insufficient storage capacity of the buffer memory in the I-DVD player. In this case, the enhanced navigator in the I-DVD system 12 performs a series of operations to re-synchronize the data stream read from the I-DVD 10 and the audio data provided from the CP server 300, as will hereinafter be described in detail.

Figure 3:
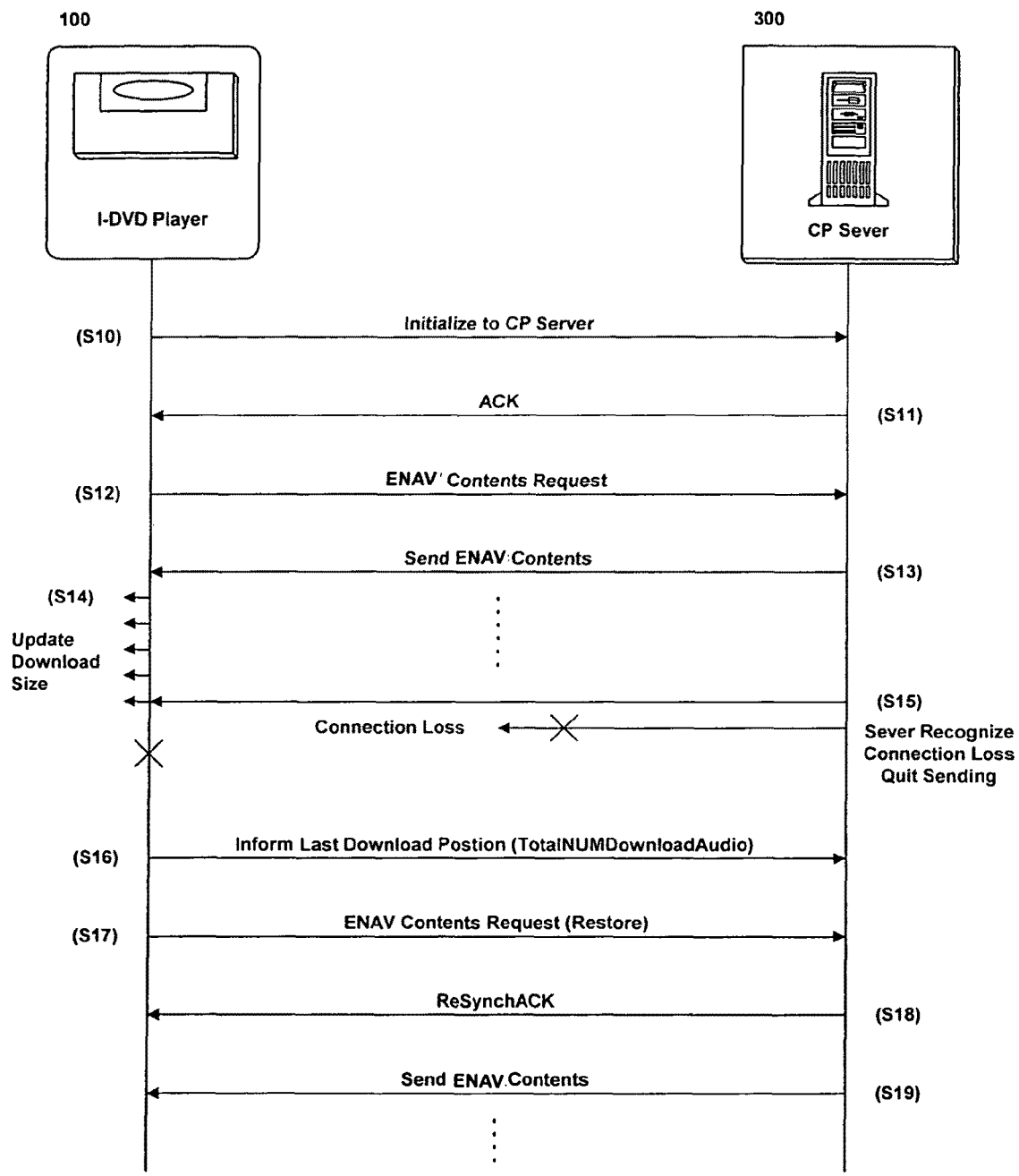
FIG. 3 is a flow chart illustrating a procedure of sending and receiving data between the interactive optical disc device and the contents provider server in accordance with a first embodiment of the present invention.

FIG. 3 is a flow chart illustrating a procedure of sending and receiving data between the interactive optical disc device and the contents provider server in accordance with a first embodiment of the present invention. For example, upon occurrence of an event based on a script or a user's request while reproducing an A/V stream from the I-DVD 10 loaded in the device as stated previously, the I-DVD player 100 initializes an Internet connection with the CP server 300 (S10), and the CP server 300 performs a corresponding operation (S11).

Thereafter, the I-DVD player 100 generates a command for requesting sending of ENAV contents information, such as audio data corresponding to the A/V stream being currently reproduced, and sends the generated command to the CP server 300 (S12).

In response to the command from the I-DVD player 100, the CP server 300 retrieves the requested audio data from a database (not shown) and then sends it as ENAV contents information to the I-DVD player 100 (S13). The I-DVD player 100 downloads and temporarily stores the audio data provided as the ENAV contents information from the CP server 300 into the buffer memory 14, and then reproduces the stored audio data together with video data read from the I-DVD 10 while synchronizing it with the video data.

Meanwhile, the I-DVD player 100 continuously updates the size of audio data, or ENAV contents information, downloaded into the buffer memory 14 (S14). Also, the CP server 300 has an error processing function prepared against network connection losses, such as clients' access failures on the Internet and time-out, and listens to clients' accesses.

If a network connection loss occurs, the CP server 300 quits the sending of the ENAV contents information (S15). If the sending of the ENAV contents information is quitted, the I-DVD player 100 checks the last download position of the buffer memory 14, for example, information 'TotalNumDownloadAudio' indicative of an offset of the audio data downloaded from the CP server 300 and stored in the buffer memory 14, and then sends the checked result to the CP server 300 (S 16).

Thereafter, the I-DVD player 100 generates a command for requesting re-sending of the ENAV contents information, for example, a command 'Restore' for requesting re-sending of ENAV contents information subsequent to the offset of the audio data downloaded into the buffer memory 14, and then sends the generated command to the CP server 300 (S17).

Meanwhile, the CP server 300 recognizes a recording position of audio data at a point of time that the ENAV contents information sending is quitted, with reference to the information 'TotalNumDownloadAudio' received through the above procedure, and, upon receiving the command 'Restore', sends a corresponding command 'ReSynchACK' to the I-DVD player 100 (S 18), reads ENAV contents information at the recognized recoding position and re-sends the read ENAV contents information to the I-DVD player 100 (S19). The I-DVD player 100 recognizes only ENAV contents information just after the command 'ReSynchACK' sending, as normal data, so it can establish an accurate re-synchronization between data read from the I-DVD 10 and the contents information. This series of operations S15-S19 are repeated each time a network connection loss occurs.

Therefore, even in the case where the sending of ENAV contents information from the CP server is suspended or delayed due to a network connection loss on the Internet or an insufficient storage capacity of the buffer memory in the I-DVD player, the ENAV contents information can be normally re-sent/received through an interaction between the I-DVD player and the CP server as stated above, so that it can be normally reproduced along with data read from the I-DVD while being re-synchronized with the read data.

Figure 4:
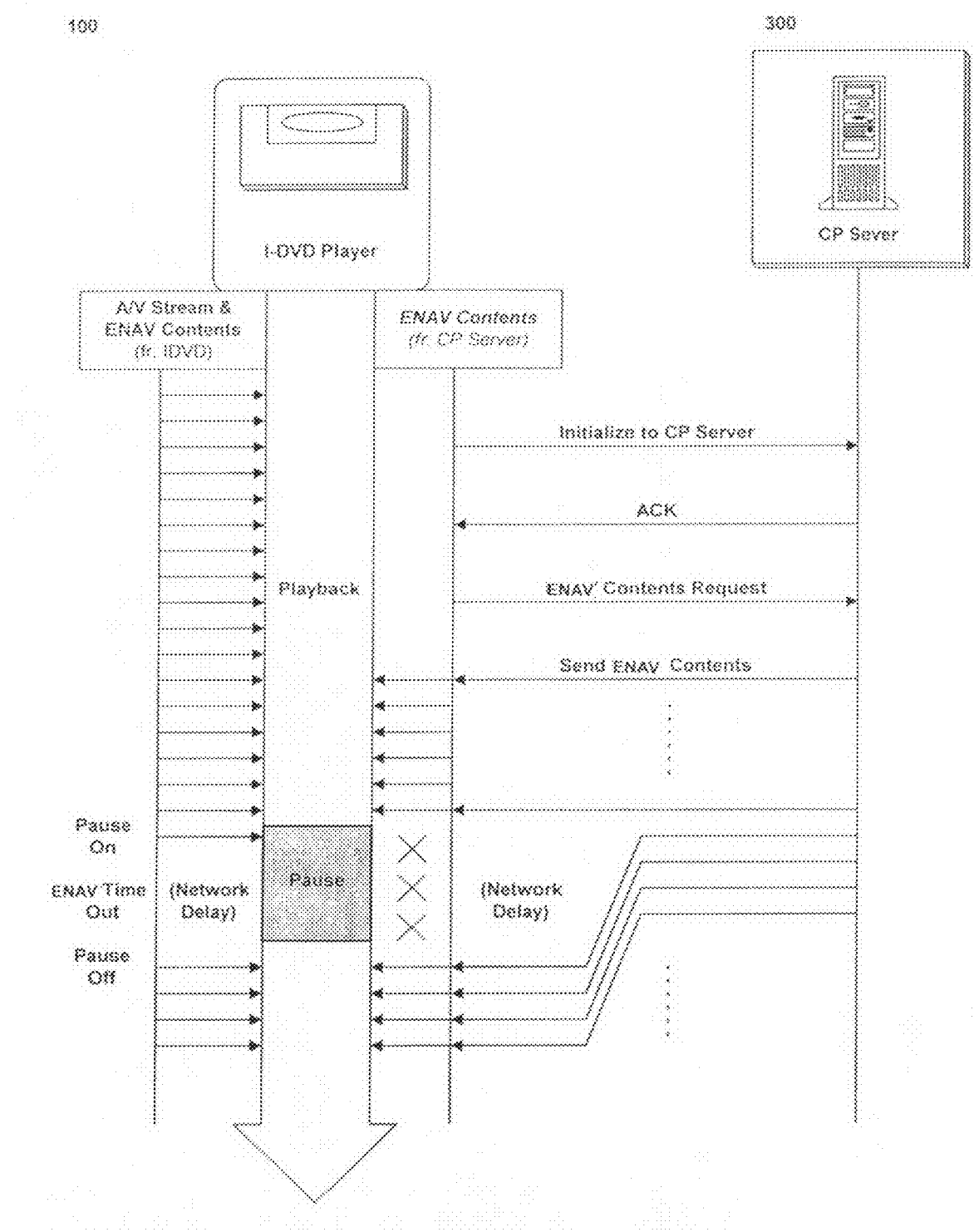
FIG. 4 is a flow chart illustrating a procedure of sending and receiving data between the interactive optical disc device and the contents provider server in accordance with a second embodiment of the present invention.

FIG. 4 is a flow chart illustrating a procedure of sending and receiving data between the interactive optical disc device and the contents provider server in accordance with a second embodiment of the present invention. As stated previously, the I-DVD player 100 initializes an Internet connection with the CP server 300, and the CP server 300 performs a corresponding operation.

Thereafter, the I-DVD player 100 generates a command for requesting sending of ENAV contents information, such as audio data corresponding to an A/V stream being currently reproduced, and outputs the generated command to the CP server 300.

In response to the command from the I-DVD player 100, the CP server 300 retrieves the requested audio data from a database and then sends it as ENAV contents information to the I-DVD player 100.

Therefore, the I-DVD player 100 synchronizes and reproduces the A/V stream and/or contents information read from the I-DVD 10 and the ENAV contents information, or audio data, downloaded from the CP server 300 and temporarily stored in the buffer memory 14.

On the other hand, because the sending of the audio data over the Internet may be delayed due to a network connection loss on the Internet as stated above, the I-DVD player 100 determines whether the size of audio data temporarily stored in the buffer memory 14 and not reproduced yet is zero or below a predetermined reference value. If the size of the stored audio data is zero or below the predetermined reference value, the I-DVD player 100 automatically changes the current play mode to a Pause On mode, and sets a Pause On hold time by checking information 'EnavTimeOut' indicative of a period of time for which the reproduction operation of the I-DVD should be held in the Pause On mode.

At the time that audio data is normally received over the Internet in the Pause On mode, the I-DVD player 100 automatically changes the current operation mode from the Pause On mode to a Pause Off mode, and thus re-synchronizes and reproduces data read from the I-DVD and the contents information provided from the CP server. On the other hand, if there is no audio data received even after the set Pause On hold time has elapsed, the I-DVD player 100 automatically changes the current operation mode from the Pause On mode to the Pause Off mode to resume the reproduction operation beginning with a paused play position.

Figure 5:
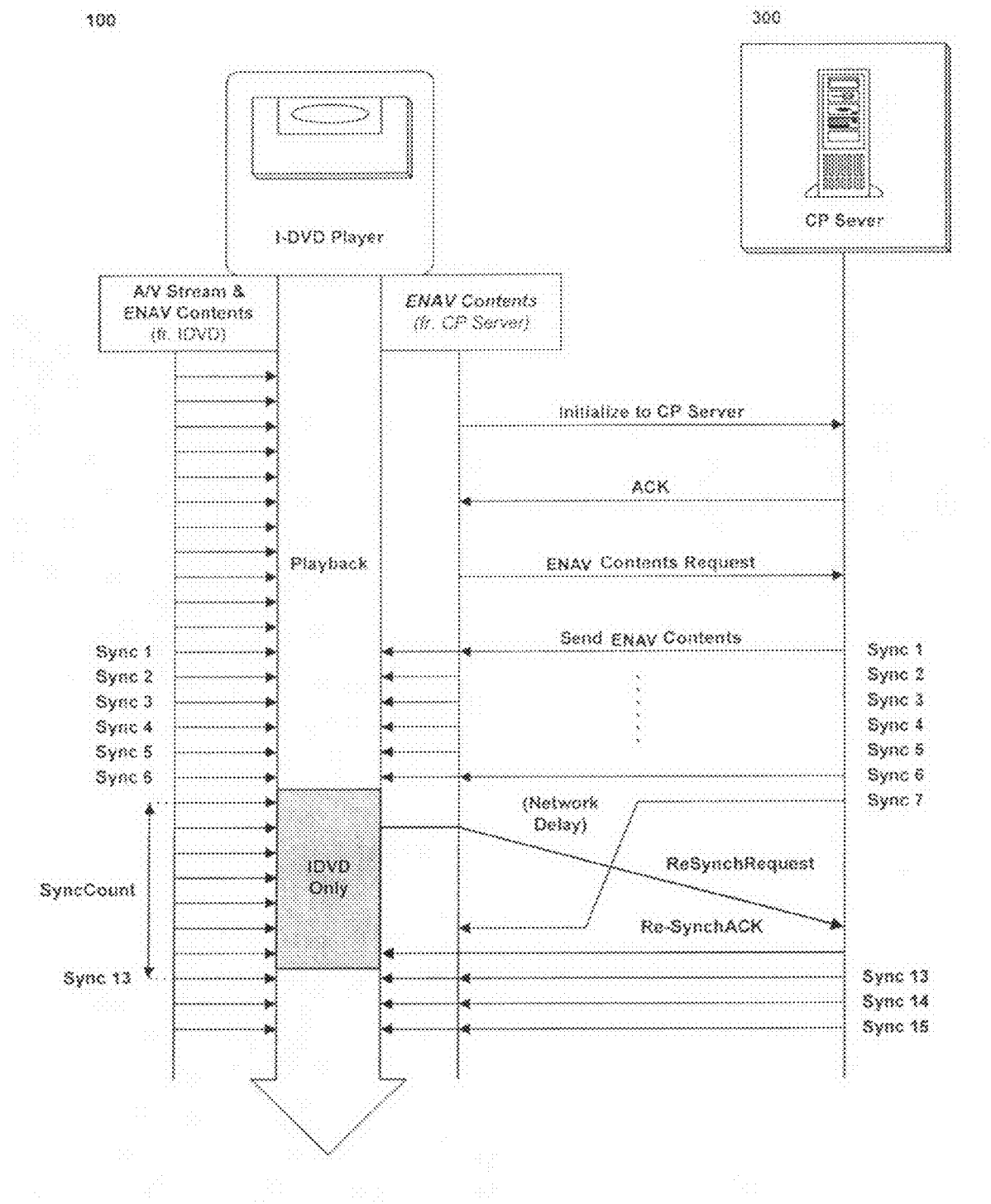
FIG. 5 is a flow chart illustrating a procedure of sending and receiving data between the interactive optical disc device and the contents provider server in accordance with a third embodiment of the present invention.

FIG. 5 is a flow chart illustrating a procedure of sending and receiving data between the interactive optical disc device and the contents provider server in accordance with a third embodiment of the present invention. As stated previously, the I-DVD player 100 initializes an Internet connection with the CP server 300, and the CP server 300 performs a corresponding operation.

Thereafter, the I-DVD player 100 generates a command for requesting sending of ENAV contents information, such as audio data corresponding to an ANV stream being currently reproduced, and outputs the generated command to the CP server 300.

In response to the command from the I-DVD player 100, the CP server 300 retrieves the requested audio data from a database and then sends it as ENAV contents information to the I-DVD player 100. At this time, the CP server 300 and the I-DVD player 100 count the number of synchronizations of the audio data sent/received as stated above and manage the counted result as information 'SyncCount'.

The I-DVD player 100 then synchronizes and reproduces the A/V stream and/or contents information read from the I-DVD 10 and the ENAV contents information, or audio data, downloaded from the CP server 300 and temporarily stored in the buffer memory 14.

On the other hand, when the sending of the audio data over the Internet is suspended or delayed due to a network connection loss on the Internet as stated above, the I-DVD player 100 calculates a re-synchronizable predictive synchronization count value 'PredictSyncCount' with reference to a bandwidth of a network bit rate under the condition of maintaining the current play mode as it is.

For example, in the case where a value obtained by counting synchronizations of normally received audio data is 'Sync 6' and the re-synchronizable predictive synchronization count value 'PredictSyncCount' is 'Sync 13', the I-DVD player 100 generates a command for requesting sending of audio data corresponding to the count value 'Sync 13', for example, a command 'ReSynchRequest', and then sends the generated command to the CP server 300.

In response to the command 'ReSynchRequest', the CP server 300 seeks a recording position of the audio data corresponding to the count value 'Sync 13', reads the audio data at the sought recording position and sends it to the I-DVD player 100. At this time, the CP server 300 first sends information 'ReSynchACK' for notification of re-sending of the audio data and then sends the audio data sequentially.

Meanwhile, the I-DVD player 100 discards audio data received over the Internet before the information 'ReSynchACK' is received. Therefore, the I-DVD player 100 reproduces the contents information re-sent from the CP server 300 after reception of the information 'ReSynchACK' while re-synchronizing it with data being currently read from the I-DVD 10.

Figure 6:
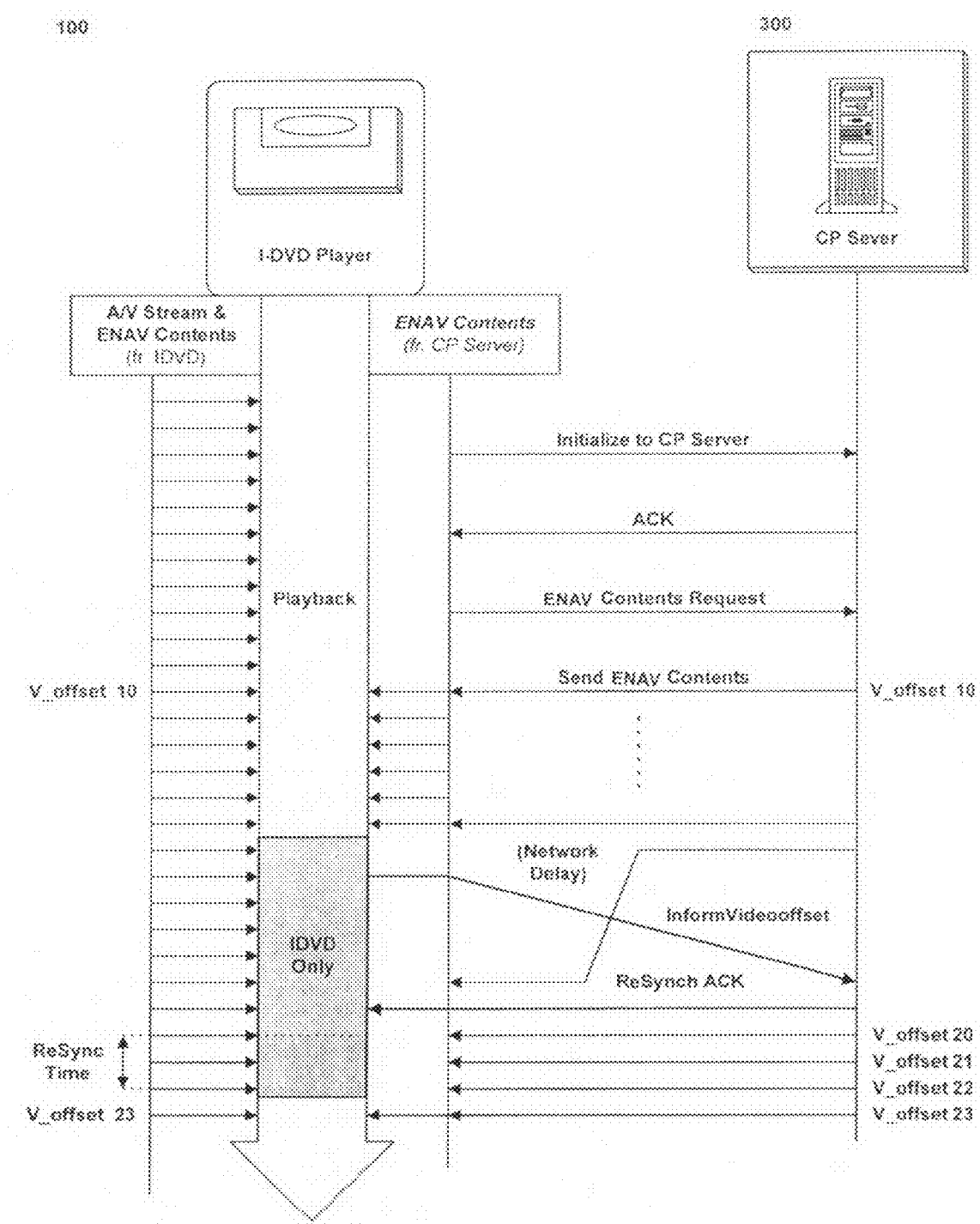
FIG. 6 is a flow chart illustrating a procedure of sending and receiving data between the interactive optical disc device and the contents provider server in accordance with a fourth embodiment of the present invention.

FIG. 6 is a flow chart illustrating a procedure of sending and receiving data between the interactive optical disc device and the contents provider server in accordance with a fourth embodiment of the present invention. As stated previously, the I-DVD player 100 initializes an Internet connection with the CP server 300, and the CP server 300 performs a corresponding operation.

Thereafter, the I-DVD player 100 generates a command for requesting sending of ENAV contents information, such as audio data corresponding to an A/V stream being currently reproduced, and outputs the generated command to the CP server 300.

In response to the command from the I-DVD player 100, the CP server 300 retrieves the requested audio data from a database and then sends it as ENAV contents information to the I-DVD player 100. At this time, the I-DVD player 100 manages an offset of the video data being currently reproduced, as information 'VideoOffset'.

The I-DVD player 100 then synchronizes and reproduces the A/V stream and/or contents information read from the I-DVD 10 and the ENAV contents information, or audio data, downloaded from the CP server 300 and temporarily stored in the buffer memory 14.

On the other hand, when the sending of the audio data over the Internet is suspended or delayed due to a network connection loss on the Internet as stated above, the I-DVD player 100, under the condition of maintaining the current play mode as it is, checks the information 'VideoOffset', generates a command for requesting sending of audio data corresponding thereto, for example, a command 'InformVideoOffset', and then sends the generated command to the CP server 300.

Then, in response to the command 'InformVideoOffset', the CP server 300 calculates an audio offset corresponding to the video offset, seeks a recording position corresponding to the calculated audio offset, reads audio data at the sought recording position and sends it to the I-DVD player 100. At this time, the CP server 300 first sends information 'ReSynchACK' for notification of sending of the re-synchronizable audio data and then sends the audio data sequentially.

Meanwhile, the I-DVD player 100 checks information 'ReSyncTime' after receiving the information 'ReSynchACK'. The information 'ReSyncTime' indicates a period of time, for example, 5 seconds, required for re-synchronization between audio data re-sent from the CP server and data from the I-DVD after the information 'ReSynchACK' is received. The I-DVD player 100 discards audio data received for 5 seconds after reception of the information 'ReSynchACK', and thus re-synchronizes and normally outputs audio data received after 5 seconds and data from the I-DVD.

Also, the I-DVD player 100 may send information regarding a storage capacity of the ENAV contents information, for example, audio data, downloaded into the buffer memory 14 to the CP server 300, and the CP server 300 may check the audio data storage capacity and variably control a bit rate of audio data being sent to the I-DVD player appropriately according to the checked result.

For example, in the process of initializing the Internet connection between the CP server 300 and the I-DVD player 100, the CP server 300 allocates and sends an Internet protocol (IP) address and port number necessary for the connection to the I-DVD player 100, and the I-DVD player 100 checks the current available buffer size of the buffer memory 14 and sends the resulting information to the CP server 300.

The CP server 300 controls a bit rate of audio data being sent to the I-DVD player 100 appropriately with reference to the buffer size information from the I-DVD player 100 so as to prevent a buffer under-run or overflow of audio data to be stored in the buffer memory.

For reference, the IP address and port number may be sent in the form of a command 'ConnToCtrlServer(char *IP, cha *port)', and the buffer size information may be sent in the form of a command 'SendUsableBuffer'.

Further, in the case where the I-DVD player 100 changes the play mode to the Pause On mode in response to the user's request, it generates a command 'SendPauseOn' for notification of the Pause On mode and sends it to the CP server 300. In the case of changing the Pause On mode to the Pause Off mode, it generates a command 'SendPauseOff' for notification of the Pause Off mode and sends it to the CP server 300.

Therefore, the CP server suspends or resumes the sending of audio data according to the operation mode of the I-DVD player.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the present invention is applicable to rewritable DVDs, such as a DVD-RW and DVD-RAM, or various information storage media, as well as the I-DVD.

As apparent from the above description, the present invention provides a method for reproducing contents information in an interactive optical disc device and a method for providing contents information in a contents provider server, wherein the interactive optical disc device is connected with the contents provider server via the Internet to receive a variety of contents information provided from the contents provider server and, even if the sending of the contents information from the contents provider server to the interactive optical disc device is suspended or delayed, contents information re-sent from the contents provider server and a data stream read from an interactive DVD are re-synchronized and reproduced, so that a user of the interactive optical disc device can normally watch more various contents information.

What is claimed is:

1. A method for reproducing contents information from an interactive device, comprising:
  a) receiving contents information from a contents provider server via an Internet, storing the received contents information in a buffer memory, and synchronously reproducing data read from a storage medium and the stored contents information;
  b) if receipt of the contents information from the contents provider server is suspended or delayed, sending a last download position of the contents information in the buffer memory and a request command to the contents provider server to receive contents information subsequent to the last download position while maintaining a playback mode; and
  c) receiving the contents information subsequent to the last download position from the contents provider server in response to the request command, and synchronously reproducing the contents information subsequent to the last download position with the data read from the storage medium,
  wherein capacity information associated with a storage capacity of the buffer memory is sent to the contents provider server from the interactive device and the contents information is received from the contents provider server variably with respect to a bit rate in response to the capacity information.

2. The method as set forth in claim 1, further comprising:
  receiving from the contents provider server an acknowledgement of the request command prior to receiving the contents information.

3. The method as set forth in claim 1, wherein said contents information sent from said contents provider server is audio data, and said data read from said storage medium includes video data.

4. A method for reproducing contents information from an interactive device, comprising:
  a) receiving contents information from a contents provider server via an Internet, storing the received contents information in a buffer memory, and synchronously reproducing data read from a storage medium and the stored contents information;
  b) if receipt of the contents information from the contents provider server into the buffer memory is suspended or delayed and if a size of the contents information downloaded into the buffer memory and not reproduced yet is below a predetermined reference value, automatically pausing a data reproducing operation of the storage medium for a predetermined period of time and, after the predetermined period of time, determining whether there is contents information received over the Internet; and c) if there is contents information received over the Internet after the predetermined period of time, synchronously reproducing subsequently received contents information and data read from the storage medium, wherein capacity information associated with a storage capacity of the buffer memory is sent to the contents provider server from the interactive device and the contents information is received from the contents provider server variably with respect to a bit rate in response to the capacity information.

5. The method as set forth in claim 4, wherein the step of re-synchronizing and reproducing comprises:

delaying the step of synchronously reproducing until the size of contents information in the buffer memory and not reproduced yet becomes greater than or equal to the predetermined reference value.

6. The method as set forth in claim 4, further comprising:
resuming the paused data reproducing operation of the storage medium if there is no contents information received over the Internet after the predetermined time period has elapsed.

7. The method as set forth in claim 4, wherein said contents information sent from said contents provider server is audio data, and said data read from said storage medium includes video data.

8. A method for reproducing contents information from an interactive device, comprising:

a) receiving contents information from a contents provider server via an Internet, storing the received contents information in a buffer memory, synchronously reproducing data read from a storage medium and the stored contents information, and counting synchronizations between the data read from the storage medium and the stored contents information;

b) if receipt of the contents information from the contents provider server is suspended or delayed, estimating a number of missed synchronizations during a corresponding suspension or delay period based on the counted synchronizations while maintaining a playback mode, and sending a command for requesting re-sending of contents information corresponding to the estimated number of missed synchronizations; and c) in response to the command for requesting re-sending, receiving the contents information subsequent to the estimated number of missed synchronizations, and synchronously reproducing the contents information subsequent to the estimated number of missed synchronizations with the data read from the storage medium, herein capacity information associated with a storage capacity of the buffer memory is sent to the contents provider server from the interactive device and the contents information is received from the contents provider server variably with respect to a bit rate in response to the capacity information.

9. The method as set forth in claim 8, wherein the step of estimating a number of missed synchronizations comprises:
estimating the number of missed synchronizations with reference to a bandwidth of a current network bit rate.

10. The method as set forth in claim 8, further comprising:
receiving from the contents provider server an acknowledgement of the command for requesting re-sending prior to the step of receiving the contents information.

11. The method as set forth in claim 10, further comprising:
discarding contents information received before the acknowledgement.

12. The method as set forth in claim 8, wherein said contents information sent from said contents provider server is audio data, and said data read from said storage medium includes video data.

13. A method for reproducing contents information from an interactive device, comprising:

a) receiving contents information from a contents provider server via an Internet, storing the received contents information in a buffer memory, synchronously reproducing data read from a storage medium and the stored contents information, and calculating an offset between data read from the storage medium and contents information received from the contents provider based on offset information sent from the contents server, the offset information being associated with the data read from the storage medium;

b) if receipt of the contents information from the contents provider server is suspended or delayed, sending a command for requesting re-sending of contents information and the offset to the contents provider server while maintaining a playback mode; and c) in response to the command for requesting re-sending, receiving the contents information corresponding to the offset, and synchronously reproducing the contents information corresponding to the offset with the data read from the storage medium, wherein capacity information associated with a storage capacity of the buffer memory is sent to the contents provider server from the interactive device and the contents information is received from the contents provider server variably with respect to a bit rate in response to the capacity information.

14. The method as set forth in claim 13, wherein said step c) comprises:

receiving from the contents provider server an acknowledgement of the command for requesting re-sending prior to the step of receiving the contents information, wherein the step of synchronously reproducing includes waiting a predetermined time period after the acknowledgement is received prior to synchronizing and reproducing.

15. The method as set forth in claim 14, further comprising:
discarding contents information received prior to an end of the predetermined time period.

16. The method as set forth in claim 13, wherein said contents information sent from said contents provider server is audio data, and said data read from said storage medium includes video data.

17. An apparatus for reproducing contents information from an interactive device, comprising:

a receiving portion configured to receive contents information from a contents provider server via an Internet;

a buffer memory configured to store the received contents information;

a reproducing portion configured to reproduce data read from storage medium and the stored contents information; and a controller configured to control the reproducing portion to synchronously reproduce data read from the storage medium and the stored contents information, wherein the controller is further configured to send a last download position of the contents information in the buffer memory to the contents provider server and a request command to the contents provider server to receive contents information subsequent to the last download position if receipt of the contents information from the contents provider server is suspended or delayed while maintaining a playback mode, wherein the receiving portion is further configured to receive the contents information subsequent to the last download position from the contents provider server in response to the request command from the controller, wherein the reproducing portion is further configured to synchronously reproduce the contents information subsequent to the last download position with the data read from the storage medium according to a control of the controller, and wherein capacity information associated with a storage capacity of the buffer memory is sent to the contents provider server from the interactive device and the contents information is received from the contents provider server variably with respect to a bit rate in response to the capacity information.

18. The apparatus of claim 17, wherein the receiving portion is further configured to receive an acknowledgement of the request command prior to reception of the contents information from the contents provider server.

* * * * *